Figure 3:
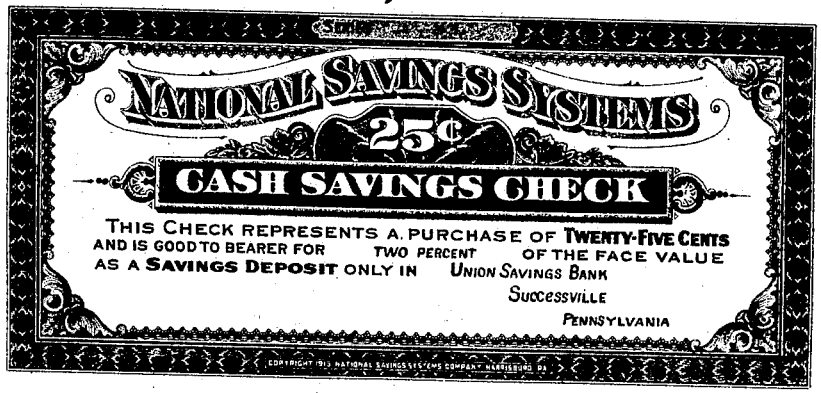

C. W. BOLL.
DISCOUNT SAVINGS CHECK.
APPLICATION FILED MAR. 30, 1915.
1,300,693.
Patented Apr. 15, 1919.
2 SHEETS—SHEET 1.
FIG. 1.
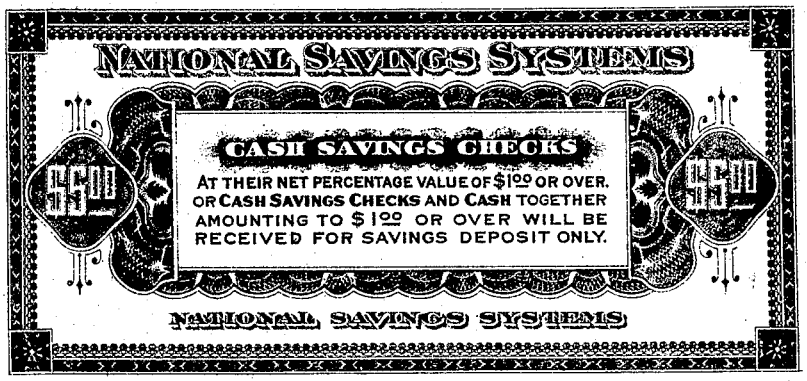
Inventor,
Charles W. Boll
by Foster Freeman Watson & Coit
Attorneys.

C. W. BOLL.
DISCOUNT SAVINGS CHECK.
APPLICATION FILED MAR. 30, 1915.

1,300,693.

Patented Apr. 15, 1919.
2 SHEETS—SHEET 2.

Inventor,
Charles W. Boll
by Foster Freeman Watson & Coe
Attorneys.

UNITED STATES PATENT OFFICE.

CHARLES W. BOLL, OF HARRISBURG, PENNSYLVANIA.

DISCOUNT-SAVINGS CHECK.

1,300,693.  Specification of Letters Patent.  Patented Apr. 15, 1919.

Application filed March 30, 1915. Serial No. 18,134.

*To all whom it may concern:*

Be it known that I, CHARLES W. BOLL, a citizen of the United States, and resident of Harrisburg, county of Dauphin, State of Pennsylvania, have invented certain new and useful Improvements in Discount-Savings Checks, of which the following is a specification.

The present invention relates to means for carrying out a method of promoting business and encouraging savings. The means comprises a series of checks, each having a fixed value, the checks being in such denominations as may be necessary or desirable for the particular kind of business in which they are used.

The method or system of doing business involved in this invention comprises the issuance by a savings bank of a series of checks of different denominations, each having a fixed value. These checks are sold by the bank to merchants. The merchants issue the checks to customers in proportion to their purchases, thus the merchant may buy a series of checks of denominations of five cents, ten cents, twenty-five cents and other convenient values up to say ten dollars, fifty dollars or one hundred dollars. The checks may be said to represent discounts on payments for purchases and these discounts attract customers to the merchant and thus the system aids his business.

The checks issued to a customer bear figures indicating the amount, or approximate amount, of the purchases of the customer and they also specify that the checks are good for a certain percentage, say two per cent., of this amount when deposited in a savings account in the bank from which the checks were purchased. The customer may therefore be said to receive his discount in cash subject only to the proviso that it must be deposited in a savings account in bank. The receipt of these savings checks naturally leads the customer of the merchant to open a savings account, which will benefit the customer and of course benefit the bank. The system therefore is of material benefit to the merchant, the customer and the bank. As the discounts on individual small purchases are too trival to deposit it is customary to provide by a suitable notice on the checks that they may be deposited when their net percentage value accumulates to the amount of one dollar and over, or with sufficient cash to make up the sum of at least one dollar for each deposit.

It is manifest that this system or method of transacting business is vastly superior to the systems now in vogue in which "coupons" are issued by merchants to customers redeemable in "premiums" which have uncertain value and which the customer may have no need for. The present invention does not involve any element of speculation and it does not encourage customers to make needless purchases. On the other hand, it enables an enterprising merchant to extend his list of customers, it promotes thrift in the customers, and it brings to the bank additional patronage.

In the accompanying drawings,

Figure 1 represents the face of one of these checks; and

Figure 4:
Figure 5:

Fig. 2 the reverse or back of the same check;

Figs. 3, 4, and 5, show the faces of additional checks of different denominations.

Referring to Figs. 1 and 2, it will be seen that on both sides of the check an amount $5.00 in figures is printed with the statement on the front of the check that "This check represents a purchase of five dollars" and the further statement that the check "Is good to bearer for two per cent. of the face value as a savings deposit only in" a certain bank. The check therefore not only indicates to the purchaser that he has received a proper discount for the full amount of his purchase, but its fixed value is stated, the only limitation being that it must be deposited in a certain bank to secure the benefit of the discount.

As indicated in Figs. 3, 4 and 5, the checks are preferably issued in numerous denominations so that, for the mutual convenience of the parties, a minimum number of checks may be issued to represent any one purchase. The checks are in convenient form for mailing and in the case of monthly accounts the merchant may mail the proper check or checks to the customer with his receipted bill when his account is paid.

Having described the invention what is claimed and desired to be secured by Letters-Patent is, 1. A check of the character referred to showing the amount of a purchase and also the definite money value thereof as a savings deposit.

2. A check indicating the amount of a purchase and having a definite money value as a savings deposit at a particular place which, as well as said deposit value, is designated on the check.

In testimony whereof I affix my signature.

CHARLES W. BOLL.

Copies of this patent may be obtained for five cents each, by addressing the "Commissioner of Patents, Washington, D. C."